(12) United States Patent
Yoshiyama et al.

(10) Patent No.: US 7,104,913 B2
(45) Date of Patent: Sep. 12, 2006

(54) DIFFERENTIAL GEAR DEVICE FOR VEHICLE

(75) Inventors: Takahiro Yoshiyama, Hiki-Gun (JP); Nakajima Shinichiro, Niiza (JP)

(73) Assignee: Toyoda Machine Works, LTD, Kariya (JP)

( * ) Notice: Subject to any disclaimer, the term of this patent is extended or adjusted under 35 U.S.C. 154(b) by 162 days.

(21) Appl. No.: 10/511,196

(22) PCT Filed: Apr. 18, 2003

(86) PCT No.: PCT/JP03/04935

§ 371 (c)(1),
(2), (4) Date: Oct. 12, 2004

(87) PCT Pub. No.: WO03/091603

PCT Pub. Date: Nov. 6, 2003

(65) Prior Publication Data

US 2005/0143212 A1 Jun. 30, 2005

(30) Foreign Application Priority Data

Apr. 24, 2002 (JP) .............................. 2002-122010

(51) Int. Cl.
*F16H 48/06* (2006.01)
(52) U.S. Cl. ..................................... 475/248
(58) Field of Classification Search ................ 475/248, 475/252
See application file for complete search history.

(56) References Cited

U.S. PATENT DOCUMENTS

| | | | | |
|---|---|---|---|---|
| 5,194,058 A | * | 3/1993 | Amborn et al. | 475/344 |
| 5,344,370 A | | 9/1994 | Luyckx | |
| 5,674,146 A | * | 10/1997 | Hayakawa et al. | 475/248 |
| 5,685,797 A | | 11/1997 | Barnsby et al. | |
| 5,785,624 A | * | 7/1998 | Mayr | 475/252 |

FOREIGN PATENT DOCUMENTS

| | | |
|---|---|---|
| JP | 04-312247 | 11/1992 |
| JP | 5-030592 | 4/1993 |
| JP | 07-113444 | 5/1995 |
| JP | 09-112657 | 5/1997 |
| JP | 2001-263437 | 9/2001 |
| JP | 2002-089659 | 3/2002 |

\* cited by examiner

*Primary Examiner*—Dirk Wright
(74) *Attorney, Agent, or Firm*—Thomas B. Ryan; Stephen B. Salai, Esq.; Harter Secrest & Emery LLP

(57) ABSTRACT

A carrier is formed with a circular cylindrical supporting part 4a. This supporting part 4a is formed with a receiving hole 4b. A planetary gear 5 is rotatably received in the receiving hole 4. One side part inner peripheral surface and the other side part inner peripheral surface of the receiving hole 4a in the peripheral direction of the supporting part 4a are each formed of a circular arcuate face having a same radius of curvature as the radius of the planetary gear 5. The centers of curvature of the circular arcuate faces forming the one side part inner peripheral surface and the other side part inner peripheral surface, respectively, are spacedly arranged from each other in the peripheral direction of the supporting part 4a. Owing to this arrangement, the interval between the one side part inner peripheral surface and the other side part inner peripheral surface of the receiving hole 4a can be made larger by a portion equal to the distance between the centers of curvature than the outside diameter of the planetary gear.

10 Claims, 13 Drawing Sheets

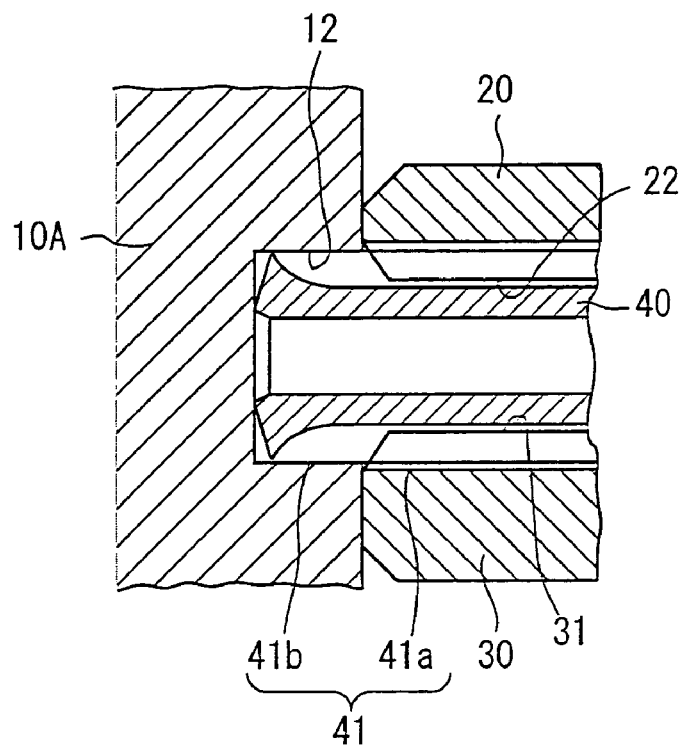
F I G. 7
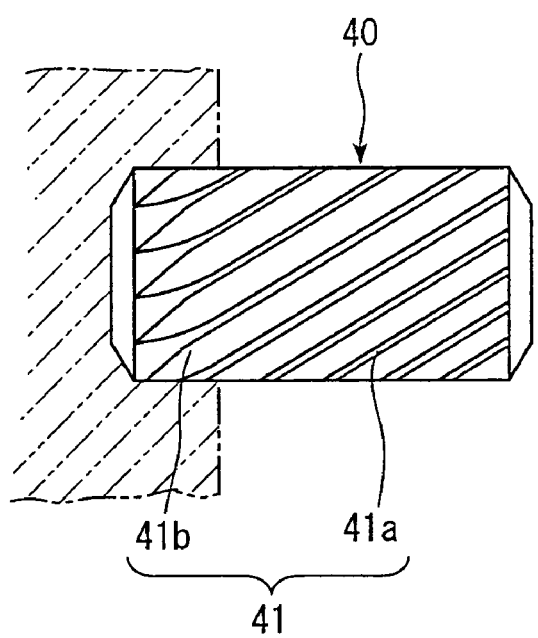
F I G. 8

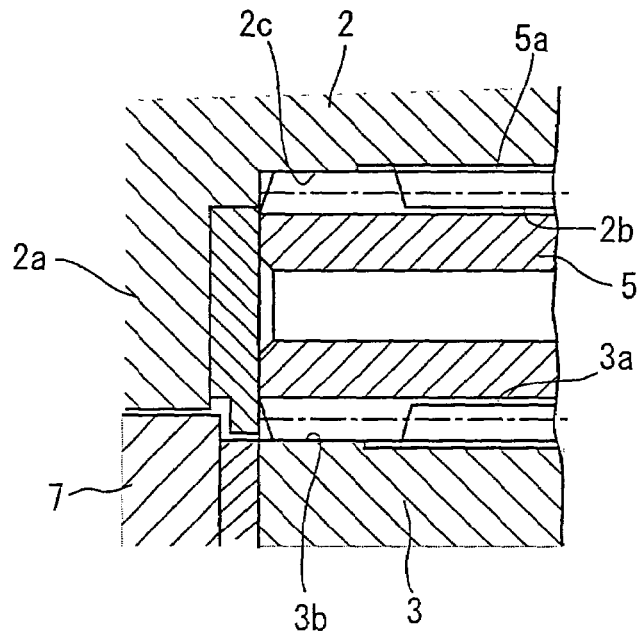
F I G. 1 5
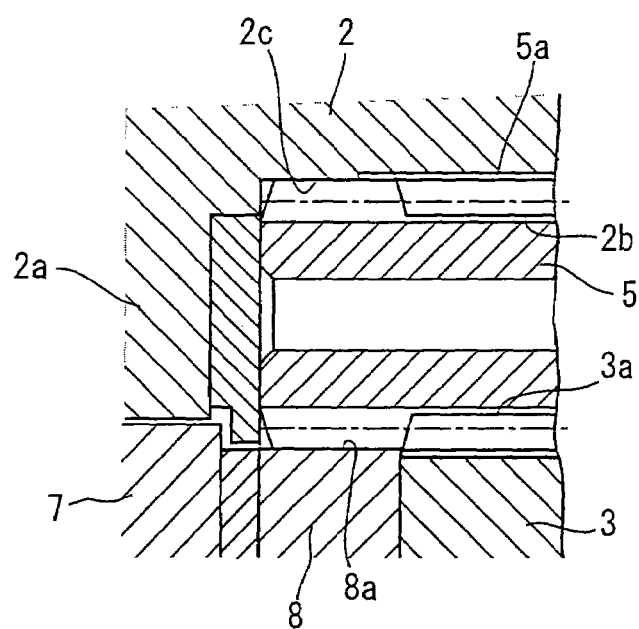
F I G. 1 6

DIFFERENTIAL GEAR DEVICE FOR VEHICLE

TECHNICAL FIELD

This invention relates to a differential gear apparatus for vehicles.

BACKGROUND ART

In general, a differential gear apparatus for vehicles includes a plurality of planetary gears which can rotate and revolve. Each planetary gear is rotatably (about its own axis) received in a receiving hole formed in a carrier (see Official Gazettes of Japanese Patent Application Laid-Open Nos. H04-312247, H09-112657 and 2002-89659).

Since the planetary gear rotates about its own axis, its outer peripheral surface slide-contacts the inner peripheral surface of the receiving hole. Moreover, the end face of the planetary gear slide-contacts the bottom surface of the receiving hole or a member for axially supporting the planetary gear. Owing to this arrangement, in the conventional differential gear apparatus, there is such a problem that the planetary gear is easily worn out early.

One example of such a problem will now be described in more detail. FIG. 4 is a sectional view showing a state in which a planetary gear P is received in a receiving hole Q1 of a carrier Q. The inside diameter of the receiving hole Q1 is set to be larger than the outside diameter of the planetary gear P so that the planetary gear P can rotate about its own axis and a lubricant can be received between the inner peripheral surface of the receiving hole Q1 and the outer peripheral surface of the planetary gear P. When the outer peripheral surface of the planetary gear P is pressed against the inner peripheral surface of the receiving hole Q1, in a case wherein the inside diameter of the receiving hole Q1 is set to be larger than the outside diameter of the planetary gear Q, the contact area between the inner peripheral surface of the receiving hole Q1 and the outer peripheral surface of the planetary gear P is reduced compared with a case wherein the inside diameter of the receiving hole Q1 is set to be equal to the outside diameter of the planetary gear P. For this reason, the outer peripheral surface of the planetary gear P is easily worn out early.

DISCLOSURE OF THE INVENTION

In order to solve the above-mentioned problem, according to a first embodiment of the present invention, there is provided a differential gear apparatus for vehicles comprising an internal gear, a sun gear disposed in the internal gear with an axis thereof aligned with that of the internal gear, a carrier including a circular cylindrical supporting part inserted between the internal gear and the sun gear with an axis thereof aligned with the axes of the internal gear and the sun gear, the supporting part being formed with a receiving hole whose axially outer and inner sides are open, and a planetary gear rotatably received in the receiving hole of the carrier and meshed with the internal gear at the open part on the outer side of the receiving hole and meshed with the sun gear at the open part on the inner side of the receiving hole, wherein one side part of an inner peripheral surface of the receiving hole in a peripheral direction of the supporting part is constituted of an arcuate face having a same radius of curvature as the radius of the planetary gear, the other side part is constituted of an arcuate face having a radius of curvature equal to or larger than the radius of the planetary gear, and when the planetary gear is contacted with the one side part or the other side part of the inner peripheral surface of the receiving hole, a gap is formed between the other side part of the inner peripheral surface of the receiving hole and the outer peripheral surface of the planetary gear.

It is preferable that the one side part and the other side part of the inner peripheral surface of the receiving hole are each constituted of an arcuate face having a same radius of curvature as the radius of the planetary gear. Centers of curvature of the respective arcuate faces constituting the one side part and the other side part of the inner peripheral surface of the receiving hole are preferably arranged spaced away from each other in the peripheral direction of the supporting part.

According to a second embodiment of the present invention, there is provided a differential gear apparatus for vehicles comprising an internal gear, a sun gear disposed in the internal gear with an axis thereof aligned with that of the internal gear, a carrier including a circular cylindrical supporting part inserted between the internal gear and the sun gear with an axis thereof aligned with the axes of the internal gear and the sun gear, the supporting part being formed with a receiving hole whose axially outer and inner sides are open, and a planetary gear rotatably received in the receiving hole of the carrier and meshed with the internal gear at the open part on the outer side of the receiving hole and meshed with the sun gear at the open part on the inner side of the receiving hole, wherein a part of the planetary gear meshed with the internal gear and the sun gear is formed in a complete gear tooth part and an end part of the planetary gear axially projecting from the internal gear and the sun gear is formed in an incomplete gear tooth part, and the width of a tooth crest of the incomplete gear tooth part in the peripheral direction of the planetary gear is set larger than the width of a tooth crest of the complete gear tooth part.

It is preferable that a part of the receiving hole receiving therein an end part of the planetary gear where the incomplete gear tooth part is formed is a circular hole, in section, continuously formed over the entire periphery.

According to a third embodiment of the present invention, there is provided a differential gear apparatus for vehicles comprising a housing, a sun gear rotatably disposed in the housing and having a helical tooth, and a planetary gear disposed in the housing in such a manner as to be able to rotate about its own axis and meshed with the sun gear, the housing being provided with an abutment surface which is formed on an inner surface thereof and which is adapted to allow an end face of the planetary gear to abut therewith, the planetary gear being provided with a tapered face-like chamfering which is formed on the outer periphery side of an end face of the planetary gear and whose width in the radial direction of the planetary gear is equal to or more than the height of tooth of the planetary gear, wherein an intersection part between an end face of the planetary gear and the chamfering is formed with a convexly curved surface part capable of smoothly contacting the end face of the planetary gear and the chamfering.

According to a fourth embodiment of the present invention, there is provided a differential gear apparatus for vehicles comprising an internal gear, a sun gear disposed in the internal gear with an axis thereof aligned with that of the internal gear, a carrier including a circular cylindrical supporting part inserted between the internal gear and the sun gear with an axis thereof aligned with the axes of the internal gear and the sun gear, the supporting part being formed with a receiving hole whose axially outer and inner sides are open, and a planetary gear rotatably received in the receiving hole of the carrier and meshed with the internal gear at the open part on the outer side of the receiving hole and meshed with the sun gear at the open part on the inner side of the receiving hole, wherein the internal gear is provided at an inner peripheral surface thereof with a first guide part annularly extending about the axis of the internal gear and capable of abutting with an outer peripheral surface of the planetary gear, and the sun gear is provided at an outer peripheral surface thereof opposing the first guide part with a second guide part annularly extending about the axis of the sun gear and capable of abutting with an outer peripheral surface of the planetary gear.

According to a fifth embodiment of the present invention, there is provided a differential gear apparatus for vehicles comprising an internal gear, a sun gear disposed in the internal gear with an axis thereof aligned with that of the internal gear, a carrier including a circular cylindrical supporting part inserted between the internal gear and the sun gear with an axis thereof aligned with the axes of the internal gear and the sun gear, the supporting part being formed with a receiving hole whose axially outer and inner sides are open, and a planetary gear rotatably received in the receiving hole of the carrier and meshed with the internal gear at the open part on the outer side of the receiving hole and meshed with the sun gear at the open part on the inner side of the receiving hole, wherein the internal gear is provided at an inner peripheral surface thereof with a first guide part annularly extending about the axis of the internal gear and capable of abutting with an outer peripheral surface of the planetary gear, a guide member is disposed at an inner side of the internal gear, the guide member is provided at an outer peripheral surface thereof opposing the first guide part with a third guide part annularly extending about the axis of the internal gear and capable of abutting with an outer peripheral surface of the planetary gear.

According to a sixth embodiment of the present invention, there is provided a differential gear apparatus for vehicles comprising an internal gear, a sun gear disposed in the internal gear with an axis thereof aligned with that of the internal gear, a carrier including a circular cylindrical supporting part inserted between the internal gear and the sun gear with an axis thereof aligned with the axes of the internal gear and the sun gear, the supporting part being formed with a receiving hole whose axially outer and inner sides are open, and a planetary gear rotatably received in the receiving hole of the carrier and meshed with the internal gear at the open part on the outer side of the receiving hole and meshed with the sun gear at the open part on the inner side of the receiving hole, wherein the planetary gear is provided at an outer peripheral surface thereof with a guide shaft part capable of turnably abutting with an inner peripheral surface of the internal gear and an outer peripheral surface of the sun gear.

According to a seventh embodiment of the present invention, there is provided a differential gear apparatus for vehicles comprising an internal gear, a sun gear disposed in the internal gear with an axis thereof aligned with that of the internal gear, a carrier including a circular cylindrical supporting part inserted between the internal gear and the sun gear with an axis thereof aligned with the axes of the internal gear and the sun gear, the supporting part being formed with a receiving hole whose axially outer and inner sides are open, and a planetary gear rotatably received in the receiving hole of the carrier and meshed with the internal gear at the open part on the outer side of the receiving hole and meshed with the sun gear at the open part on the inner side of the receiving hole, wherein the internal gear is provided at an inner side thereof with a guide member having a circular guide part in section with an axis thereof aligned with the axis of the internal gear, and the planetary gear is provided at an outer peripheral surface thereof with an annular guide part capable of turnably abutting with an inner peripheral surface of the internal gear and an outer peripheral surface of the guide part.

BRIEF DESCRIPTION OF DRAWINGS

FIG. 7 is an enlarged view of an encircled part indicated by Y of FIG. 5.

FIG. 8 is a front view of a planetary gear used in the above embodiment.

FIG. 15 is an enlarged view of an encircled part indicated by Y of FIG. 13.

FIG. 16 is a sectional view like FIG. 15, but showing a fifth embodiment of the present invention.

BEST MODE FOR CARRYING OUT THE INVENTION

Several embodiments of the present invention will be described hereinafter with reference to FIGS. 1 through 17.

Figure 1:
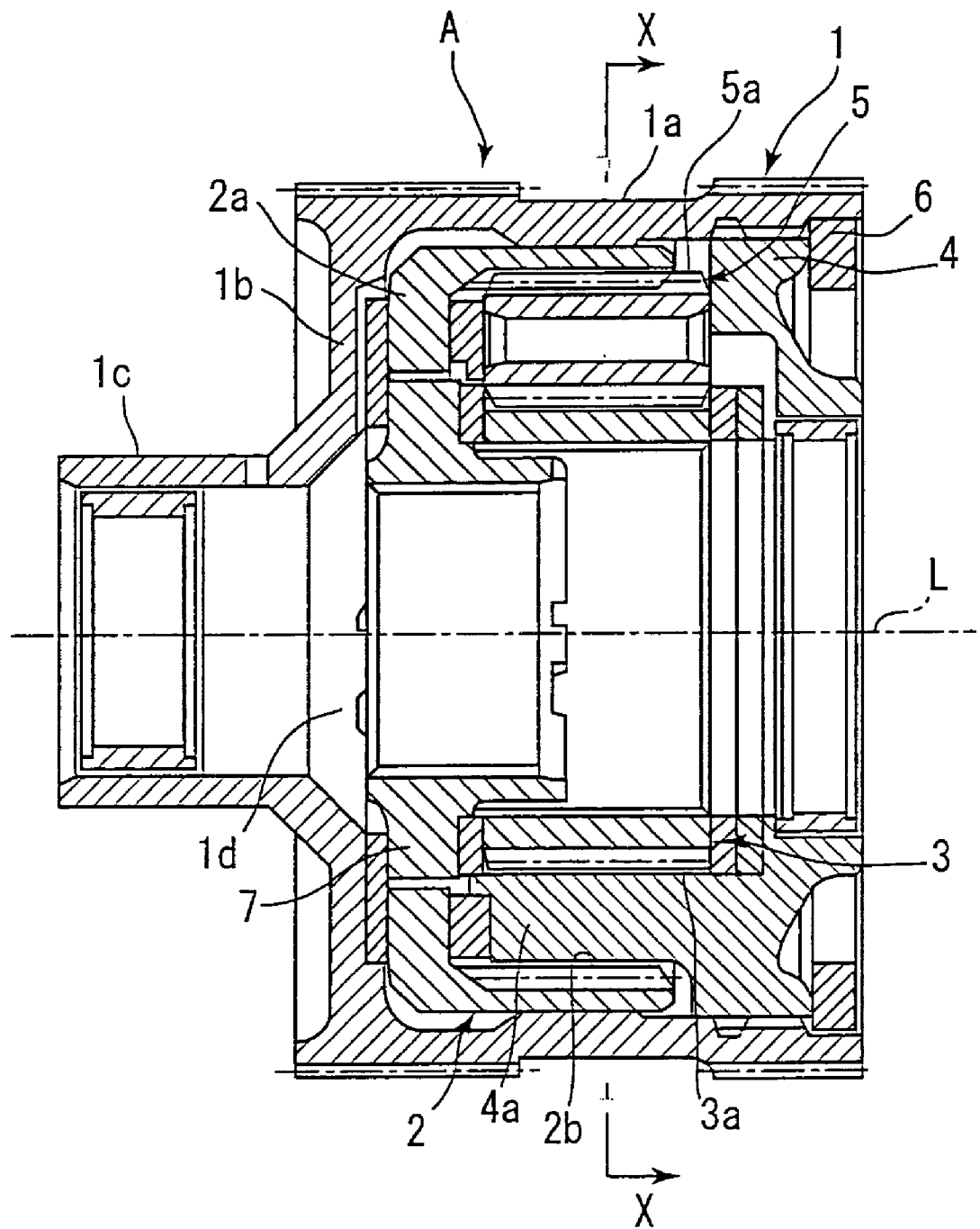
FIG. 1 is a sectional view taken on line X—X of FIG. 2 showing a first embodiment of the present invention.
Figure 2:
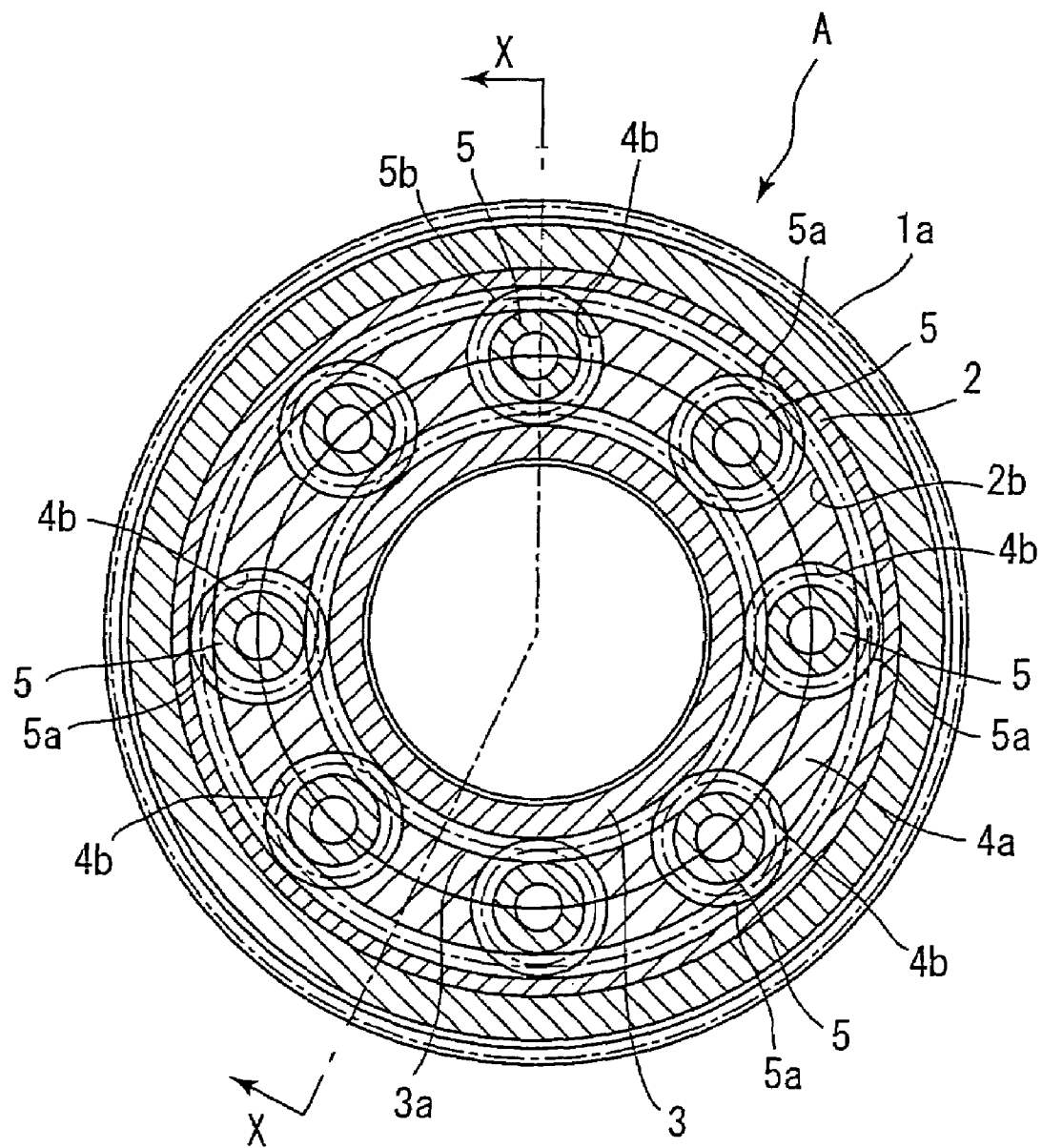
FIG. 2 is a sectional view taken on line X—X of FIG. 1.
Figure 3:
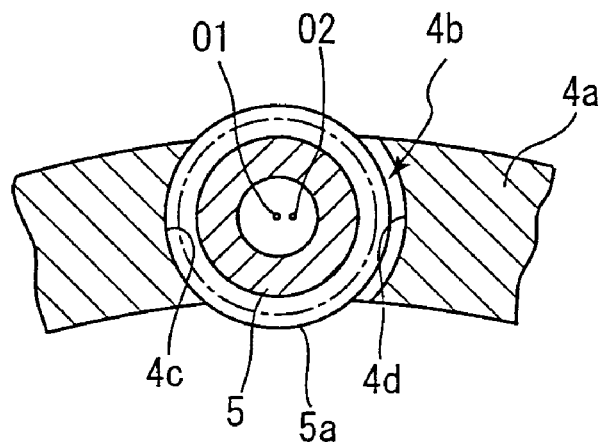
FIG. 3 is a sectional view showing an essential part of the above embodiment.
Figure 4:
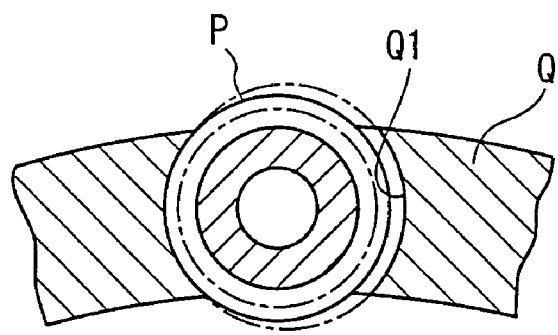
FIG. 4 is a sectional view like FIG. 3, but showing an essential part of a conventional differential gear for vehicles.

FIGS. 1 through 3 show a first embodiment of the present invention. A differential gear apparatus A for vehicles of this embodiment is mainly comprised of a housing 1, an internal gear 2, a sun gear 3, a carrier 4 and planetary gears 5.

The housing 1 includes a circular cylindrical part 1*a* which is driven for rotation about an axis L. One end part (left end part in FIG. 1) of the circular cylindrical part 1*a* is formed with a bottom part 1*b*. A central part of the bottom part 1*b* is formed with a circular cylindrical bearing part 1*c*. The internal part of the bearing part 1*c* is in communication with the internal part of the circular cylindrical part 1*a* through a through-hole 1*d* which is formed in the bottom part 1*b*. The carrier 4 is non-turnably fitted to the other end part (right end part in FIG. 1) of the inner peripheral surface of the circular cylindrical part 1*a* and positionally fixed to the circular cylindrical part 1*a* by a stopper 6. The housing 1 is supported by the inner peripheral surface of the carrier 4 and the inner peripheral surface of the bearing part 1*c* such that the housing 1 can turn about the axis L.

The internal gear 2 is rotatably fitted to the inner peripheral surface of the circular cylindrical part 1*a* with its axis aligned with the axis L. One end part (end part on the bottom part 1b side) of the internal gear 2 is formed with an annular connecting part 2a. An output member 7 is connected to the inner peripheral surface of the annular connecting part 2a by spline fitting such that the output member is non-turnable but movable in the direction of the axis L. One end part of a first output shaft (not shown), which is allowed to pierce the bearing part 1c and then inserted into the circular cylindrical part 1a, is non-turnably connected to the output member 7 by spline fitting. The other end part of the first output shaft is connected either to one of a pair of front wheels or one of a pair of rear wheels (none of those front and rear wheels are shown). An internal gear part 2b is formed on the inner peripheral surface of the internal gear 2 at an area between the annular connecting part 2a and the other end face of the internal gear 2. This internal gear part 2b may include a helical tooth or a straight tooth.

At the inner side of the internal gear 2, the circular cylindrical sun gear 3 is rotatably disposed with its axis aligned with the axis L. An external gear part 3a is formed on the outer peripheral surface of the sun gear 3 over its entire length. One end part of a second output shaft (not shown) is non-turnably connected to the inner peripheral surface of the sun gear 3 by spline fitting. The other end part of the second output shaft is connected either to the other of the pair of front wheels or the other of the pair of rear wheels.

A circular cylindrical supporting part 4a is formed on an end face facing the bottom part 1b side of the carrier 4. This supporting part 4a is disposed with its axis aligned with the axis L and extends toward the bottom part 1b side between the inner peripheral surface of the internal gear 2 and the outer peripheral surface of an external gear 3a. A plurality of receiving holes 4b extending in parallel relation to the axis L from a distal end face toward a basal end side of the supporting part 4a are formed in the supporting parts 4a such that the receiving holes 4b are equidistantly away from each other in the peripheral direction of the supporting part 4a.

As shown in FIG. 3, an inner peripheral surface on one side part of each receiving hole 4b in the peripheral direction of the supporting part 4a is constituted of an arcuate face about a center O1 of curvature, while an inner peripheral surface 4d on the other side part of the receiving hole 4b is constituted of an arcuate face about a center O2 of curvature. The centers O1, O2 of curvature are located at the center between the inner peripheral surface and the outer peripheral surface of the supporting part 4a in the radial direction of the supporting part 4a. The radii of curvature of the inner peripheral surfaces 4c, 4d are equal to each other and their diameters are larger than the thickness (=(outside diameter− inside diameter of the supporting part 4a)/2). Thus, the outer side and the inner side of the receiving hole 4b in the radial direction of the supporting part 4a are open. Moreover, the respective centers O1, O2 of curvature of the inner peripheral surfaces 4c, 4d are arranged away from each other in the peripheral direction of the supporting part 4a. As a result, the interval between the two inner peripheral surfaces 4c, 4d constituting the receiving hole 4b is larger by a portion equal to the distance between the centers O1, O2 of curvature than the interval (=inside diameter of the inner peripheral surfaces 4c, 4d) when the centers O1, O2 of curvature are coincident with each other.

The planetary gear 5 is rotatably inserted in the receiving hole 4b. A gear part 5a is formed on the outer periphery of the planetary gear 5 over its entire length. This gear part 5 is meshed with the internal gear part 2b of the internal gear 2 at the outer side opening part of the receiving hole 4b and meshed with the external gear part 3a of the sun gear 3 at the inner side opening part of the receiving hole 4b. Accordingly, when the housing 1 is driven for rotation, its rotation is transmitted to the internal gear 2 and the sun gear 3 through the carrier 4 and the planetary gear 5. When the planetary gear 5 is not rotated about its own axis, the internal gear 2 and the sun gear 3 are integrally rotated. On the other hand, when the planetary gear 5 is rotated about its own axis, the internal gear 2 and the sun gear 3 are differentially rotated.

The outside diameter of the planetary gear 5 is set to be generally equal to the inside diameter of the inner peripheral surface 4c, 4d. Accordingly, a gap is formed between the outer peripheral surface of the planetary gear 5 and at least one of the inner peripheral surfaces 4c, 4d. This gap becomes maximum when the outer peripheral surface of the planetary gear 5 contacts one of the inner peripheral surfaces 4c, 4d, and its size is equal to the interval between the centers O1, O2 of curvature. The gap formed between the outer peripheral surface of the planetary gear 5 and at least one of the inner peripheral surfaces 4c, 4d is filled with a lubricating oil.

In the differential gear apparatus A for vehicles thus constructed, the inside diameter (=radius of curvature×2) of the inner peripheral surfaces 4c, 4d of the receiving hole 4b is equal to the outside diameter of the planetary gear 5 and the interval between the inner peripheral surfaces 4c, 4d is larger by a portion equal to the distance between the centers O1, O2 of curvature than the outside diameter of the planetary gear 5. Owing to this arrangement, the planetary gear 5 can be rotatably received in the receiving hole 4b and the gap formed between the outer peripheral surface of the planetary gear 5 and at least one of the inner peripheral surface 4c, 4d can be filled with the lubricating oil. Moreover, since the inside diameter of the inner peripheral surface 4c, 4d is equal to the outside diameter of the planetary gear 5, the outer peripheral surface of the planetary gear 5 is surface-contacted, if contacted, with the entire inner peripheral surfaces 4c, 4d of the receiving hole 4b. Accordingly, the surface pressure acting on between the inner peripheral surfaces 4c, 4d of the receiving hole 4b and the outer peripheral surface of the planetary gear 5 can be reduced. This makes it possible to prevent the planetary gear 5 from getting worn early.

Since the outer peripheral surface of the planetary gear 5 contacts the entire inner peripheral surface 4c or 4d, the planetary gear 5 can rotate about its own axis in a stable manner. Accordingly, at the time of rotation of the planetary gear 5, i.e., at the time of differential rotation, noises can be reduced. Depending on for what purposes the differential gear apparatus A is used, by making the rough surfaces of the inner peripheral surfaces 4c, 4d different from each other or by forming a groove in only one of the inner peripheral surfaces 4c, 4d, the friction torques of the inner peripheral surfaces 4c, 4d with respect to the outer peripheral surface of the planetary gear 5 can be changed.

In the differential gear apparatus A of this embodiment, the radii of curvature of the inner peripheral surfaces 4c, 4d are set to be generally equal to the radius of the planetary gear 5. It is also accepted that the radius of curvature of only one of the inner peripheral surfaces 4c, 4d is set to be generally equal to the radius of the planetary gear 5 and the radius of curvature of the other is set to be larger than the radius of the planetary gear 5. In the above differential gear apparatus A, the centers O1, O2 of curvature of the inner peripheral surfaces 4c, 4d are located away from each other in the peripheral direction of the supporting part 4a so that when the planetary gear 5 is contacted with one of the inner peripheral surfaces 4c, 4d, a gap will be formed between the other inner peripheral surface 4c or 4d and the outer peripheral surface of the planetary gear 5. It is also accepted that by employing other method, a gap is formed between the other inner peripheral surface 4c or 4d and the outer peripheral surface of the planetary gear 5.

The above description concerning the radii of curvature and the centers O1, O2 of curvature of the inner peripheral surfaces 4c, 4d of the receiving hole 4b and the radius of the planetary gear 5 can also be applied to differential gear apparatuses B, D as later described.

FIGS. 5 through 8 show a second embodiment of the present invention. A differential gear apparatus B for vehicles of this embodiment is the so-called hybrid differential gear apparatus in which a differential gear mechanism is assembled in a planetary differential gear mechanism. This differential gear apparatus B for vehicles comprises a housing 10 which is driven for rotation about an axis L. The housing 10 is constituted of a pair of first and second half bodies 10A, 10B. The first half body 10A has a planar configuration and the second half body 10B has a circular cylindrical configuration. The first and second half bodies 10A, 10B are abutted with each other with their axes aligned with the axis L and fixed by tightening means (not shown) such as a bolt.

An internal gear 20 is turnably received in the housing 10 with its axis aligned with the axis L. One end part of the internal gear 20 projects outward from the half body 10B. A spline part 21 is formed on the outwardly-projecting part of the internal gear 20. One end part of a first output shaft (not shown) is non-rotatably connected to this spline part 21. In case the differential gear apparatus B is used, for example, as a center differential gear and a front differential gear, the other end part of the first output shaft is connected to a rear differential gear (not shown). An internal gear part 22 is formed on the inner peripheral surface of the end part on the half body 10B side of the internal gear 20.

A sun gear 30 is turnably disposed in the internal gear part 20 with its axis aligned with the axis L. An external gear part 31 is formed on the outer peripheral surface of the sun gear 30 over its entire length. This external gear part 31 is placed opposite to the internal gear part 22 over the entire length of the external gear part 31.

A circular cylindrical supporting part 11 (see FIG. 6) is formed on the end face facing the inner side of the first half body 10A. This supporting part 11 is formed such that its axis is aligned with the axis L and inserted between the internal gear part 22 and the external gear part 31. A plurality of receiving holes 12 are formed in the supporting part 11 in such a manner as to extend in parallel with the axis L from its forward end face. The respective receiving holes 12 are equidistantly away from each other in the peripheral direction of the supporting part 11. Each receiving hole 12 extends from the forward end face of the supporting part 11 to the first half body 10A beyond its basal end. The center of the receiving hole 12 is located at the center between the outer periphery and the inner periphery of the supporting part 11. Moreover, the inside diameter of the receiving hole 12 is larger than the thickness (=(outside diameter−inside diameter of the supporting part 11)/2) of the supporting part 11. Owing to this feature, the part of the receiving hole 12 formed in the supporting part 11 is open outward at the side part on the outer side in the radial direction of the supporting part 11 and at the side part on the inner side in the radial direction of the supporting part 11. On the other hand, since the end part (left side end part in FIG. 5) on the bottom part side of the receiving hole 12 is formed in the first half body 10A, it is formed as a circular hole in section whose entire inner peripheral surface is continuous in the peripheral direction.

A planetary gear 40 is turnably (rotatably about its own axis) received in the receiving hole 12. The outside diameter of the planetary gear 40 is set to be generally equal to the inside diameter of the receiving hole 12. A gear part 41 is formed on the outer peripheral surface of the planetary gear 40 in such a manner as to extend over the entire length thereof. The gear part 41 projects outside from the inner and outer opening parts of the receiving hole 12 and meshes with the internal gear part 22 of the internal gear 20 at the outer side opening part of the receiving hole 12 and meshes with the external gear part 31 of the sun gear 30 at the inner side opening part. Thus, when the housing 10 is driven for rotation, its rotation is transmitted to the planetary gear 40 through the supporting part 11 and transmitted from the planetary gear 40 to the internal gear 20 and the sun gear 30. When the planetary gear 40 is not rotated about its own axis, the housing 10, the internal gear 20 and the sun gear 30 are integrally rotated, and when the planetary gear 40 is rotated about its own axis, the internal gear 20 and the sun gear 30 are differentially rotated. As apparent from this, in this differential gear apparatus B, the housing 10, especially, its first half body 10A serves also as a carrier.

The sun gear 30 has a ring-like configuration. A casing 50 is non-turnably connected to the inner peripheral surface of the sun gear 30 with its axis aligned with the axis L. This casing 50 is provided with a supporting shaft 60 which is orthogonal to the axis L. A pair of pinion gears 70A, 70B are turnably fitted in opposite end parts of the supporting shaft 60 within the casing 50. Side gears 80A, 80B, which are meshed with the pair of pinion gears 70A, 70B, respectively, are arranged in such a manner as to align their axes with the axis L. Therefore, when the sun gear 30 is rotated, the pinion gears 70A, 70B and the side gears 80A, 80B are rotated in accordance with the rotation of the sun gear 30. When the pinion gears 70A, 70B are not rotated about their own axes, the side gears 80A, 80B are integrally rotated together with the casing 50 and the supporting shaft 60. On the other hand, when the pinion gears 70A, 70B are rotated about their own axes, the side gears 80A, 80B are differentially rotated. One end parts of a second and a third output shaft (not shown) are non-turnably connected to the side gears 80A, 80B, respectively. In case this differential gear apparatus B is used, for example, as a center differential gear and a front differential gear, the other end parts of the second and third output shafts are connected to the left and right front wheels, respectively.

Figure 5:
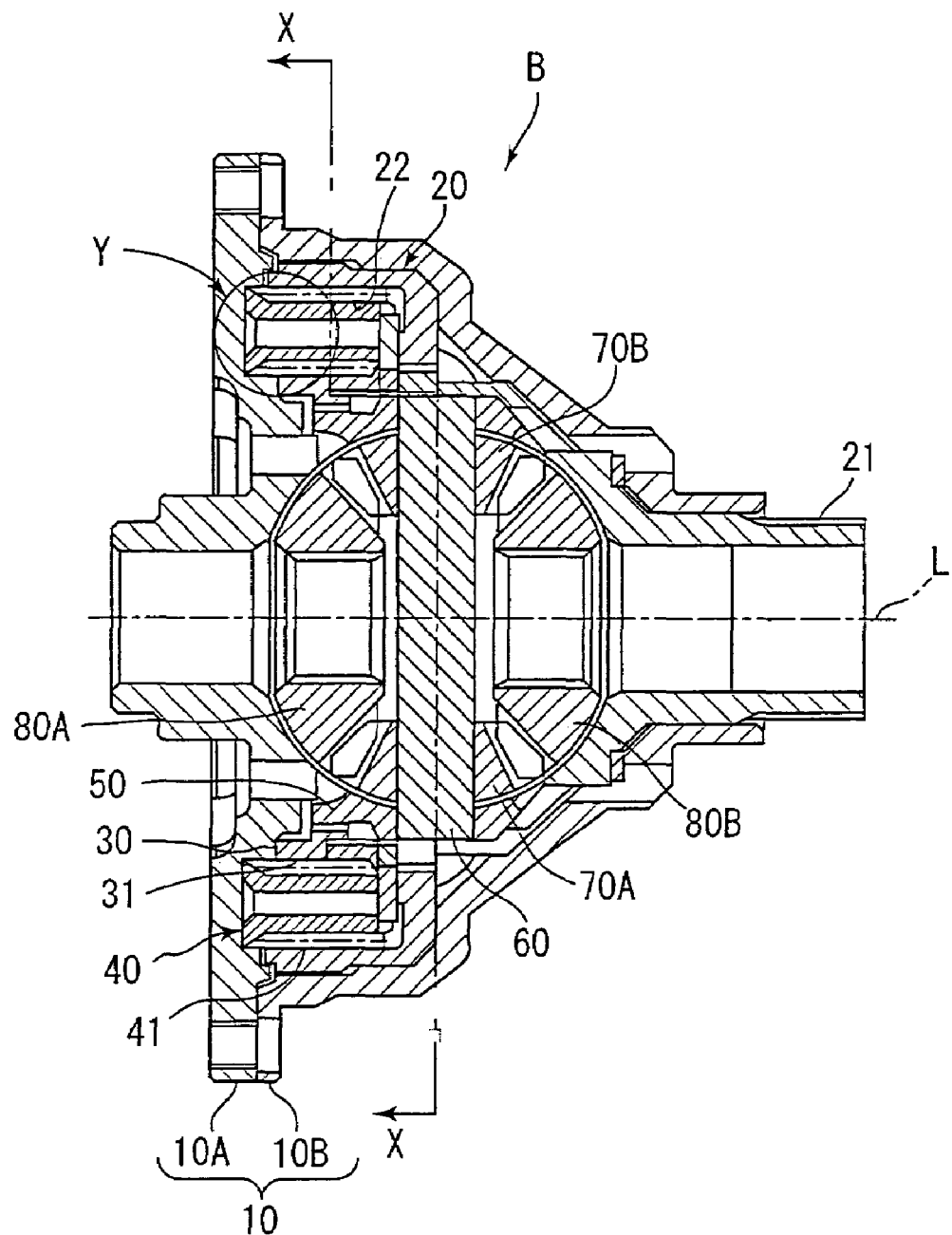
FIG. 5 is a sectional view showing a second embodiment of the present invention.
Figure 6:
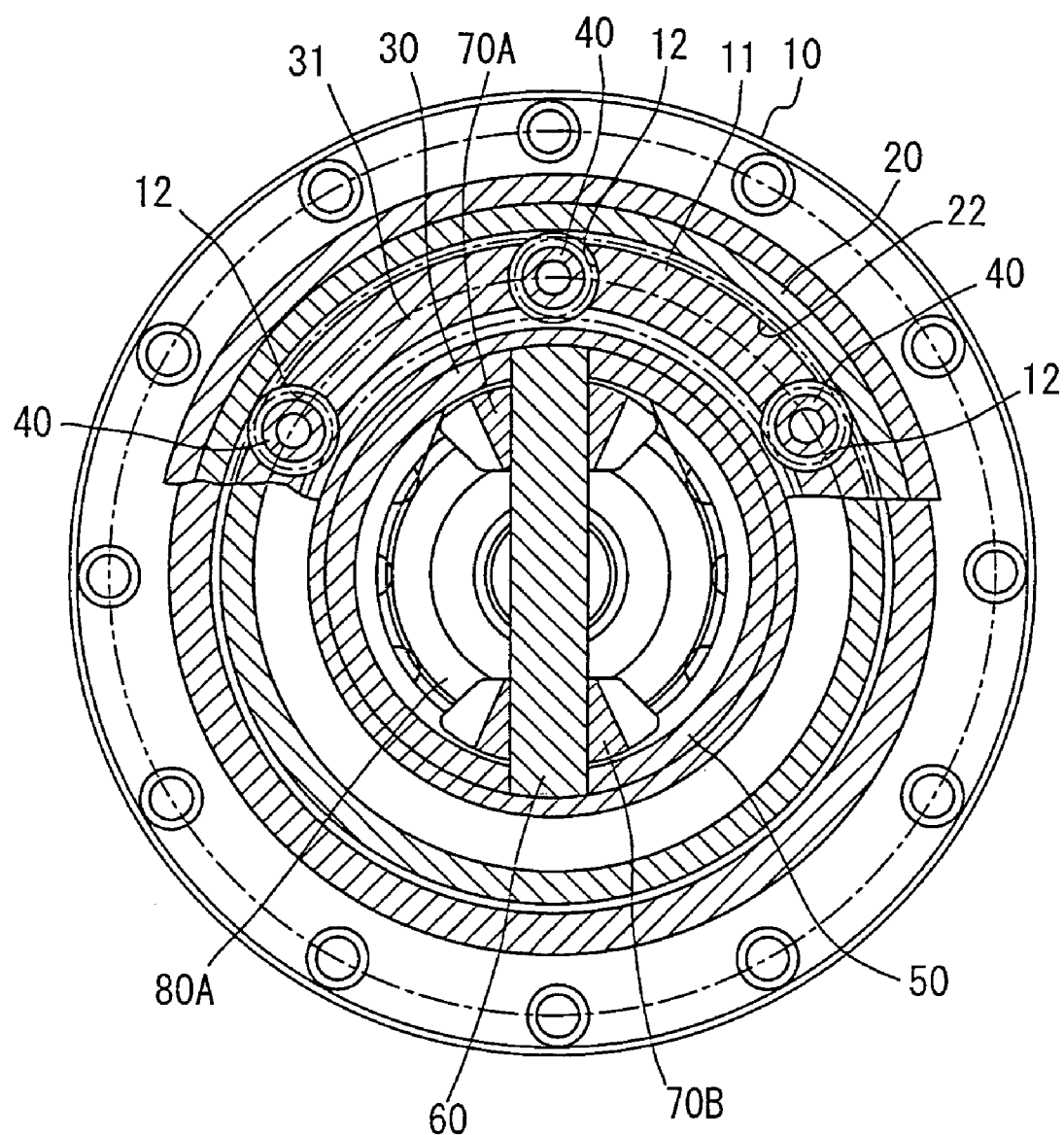
FIG. 6 is a sectional view taken on line X—X of FIG. 5.

As shown in FIG. 5, a large part of the gear part 41 of the planetary gear 40, i.e., a large part accommodated in a part which is formed on the supporting part 11 in the receiving hole 12 is meshed with the internal gear part 22 of the internal gear 20 and the external gear part 31 of the sun gear 30. However, a left end part of the planetary gear 40 is projected leftward of FIG. 5 from the internal gear part 22 and the external gear part 31 and received in a part formed on the first half body 10A in the receiving hole 12, i.e., a circular part in section of the receiving hole 12. As shown in FIGS. 7 and 8, a part of the gear part 41 of the planetary gear 40 meshed with the internal gear part 22 of the internal gear 20 and the external gear part 31 of the sun gear 30 is formed in a complete gear tooth part 41a. On the other hand, an end part of the gear part 41 projecting leftward from the internal gear part 22 of the internal gear 20 and the external gear part 31 of the sun gear 30 is formed in an incomplete gear tooth part 41b. In the part formed in the incomplete gear tooth part 41b, the width of the tooth crest in the peripheral direction of the planetary gear 40 is larger than the width of the tooth crest of the complete gear tooth part 41a. In case, for example, the gear part 41 is subjected to gear cutting process using a hob (not shown), the such incomplete gear tooth part 41b can be formed by finishing the gear cutting processing when the center of the hob reaches a position corresponding to the left side end part of the complete gear tooth part 41a.

The differential gear apparatus B thus constructed, since the width of the tooth crest of the incomplete gear tooth part 41b in the peripheral direction of the planetary gear 40 is larger than the width of the tooth crest of the complete gear tooth part 41a, the contact area between the outer peripheral surface of the planetary gear 40 and the inner peripheral surface of the receiving hole 12 can be increased to that portion. Especially, in this embodiment, since the part of the receiving hole 12 in which the incomplete gear tooth part 41b is received is formed in a perfect circular cylindrical configuration, the contact area between the outer peripheral surface of the planetary gear 40 and the inner peripheral surface of the receiving hole 12 can further be increased. Thus, the contact surface pressure between the outer peripheral surface of the planetary gear 40 and the inner peripheral surface of the receiving hole 12 can be reduced and the planetary gear 40 can be prevented from getting worn early.

Since the contact area between the outer peripheral surface of the planetary gear 40 and the inner peripheral surface of the receiving hole 12 can be increased, the planetary gear 40 can be rotated smoothly. This makes it possible to reduce the generation of noises during the differential operation and stabilize the torque bias ratio.

The arrangement for preventing the planetary gear 40 from getting worn early in which an end part of the gear part 41 of the planetary gear 40 projecting in the direction of the axis L from the internal gear part 22 of the internal gear 20 and the external gear part 31 of the sun gear 30 is formed in an incomplete gear tooth part 41b and the width of the tooth crest of the incomplete gear tooth part 41b in the peripheral direction of the planetary gear 40 is set to be larger than the width of the tooth crest of the complete gear tooth part 41a, can likewise be applied not only to the above-mentioned differential gear apparatus A but also to a differential gear apparatus D as later described.

Figure 9:
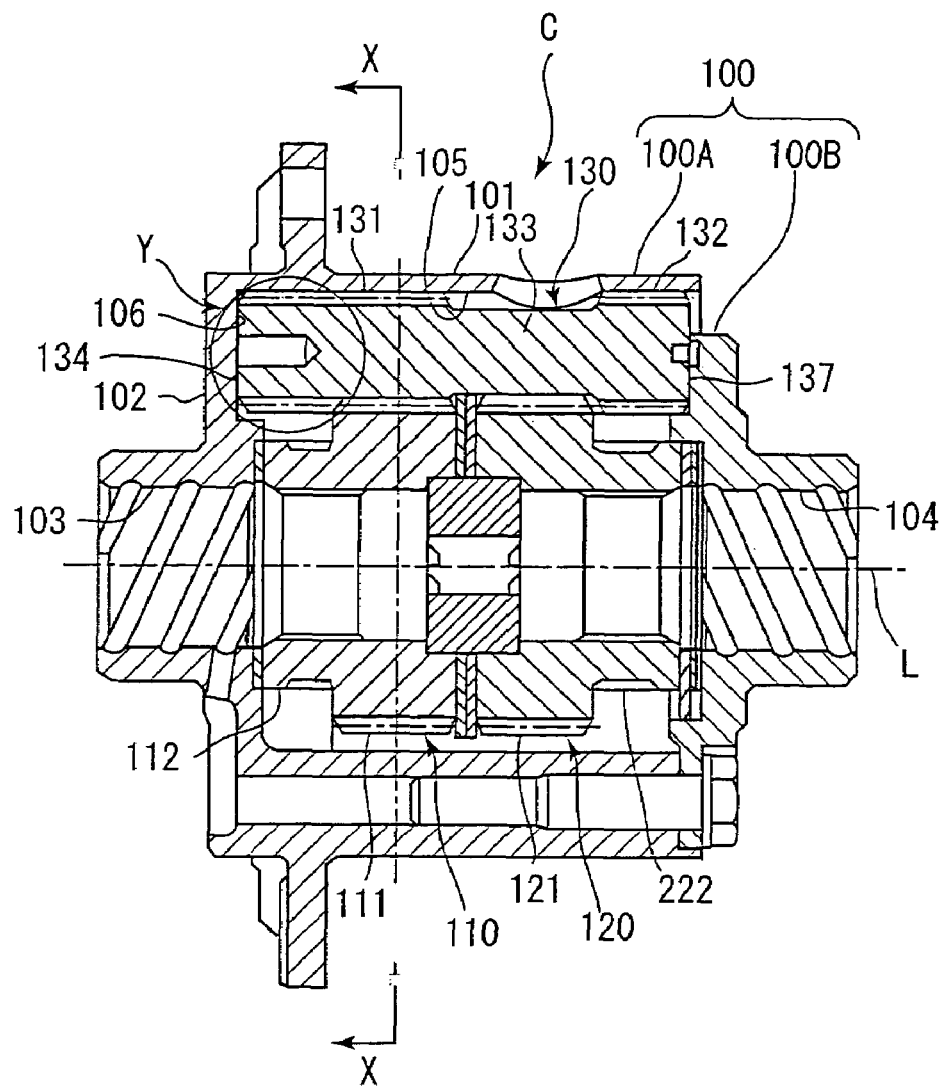
FIG. 9 is a sectional view showing a third embodiment of the present invention.
Figure 10:
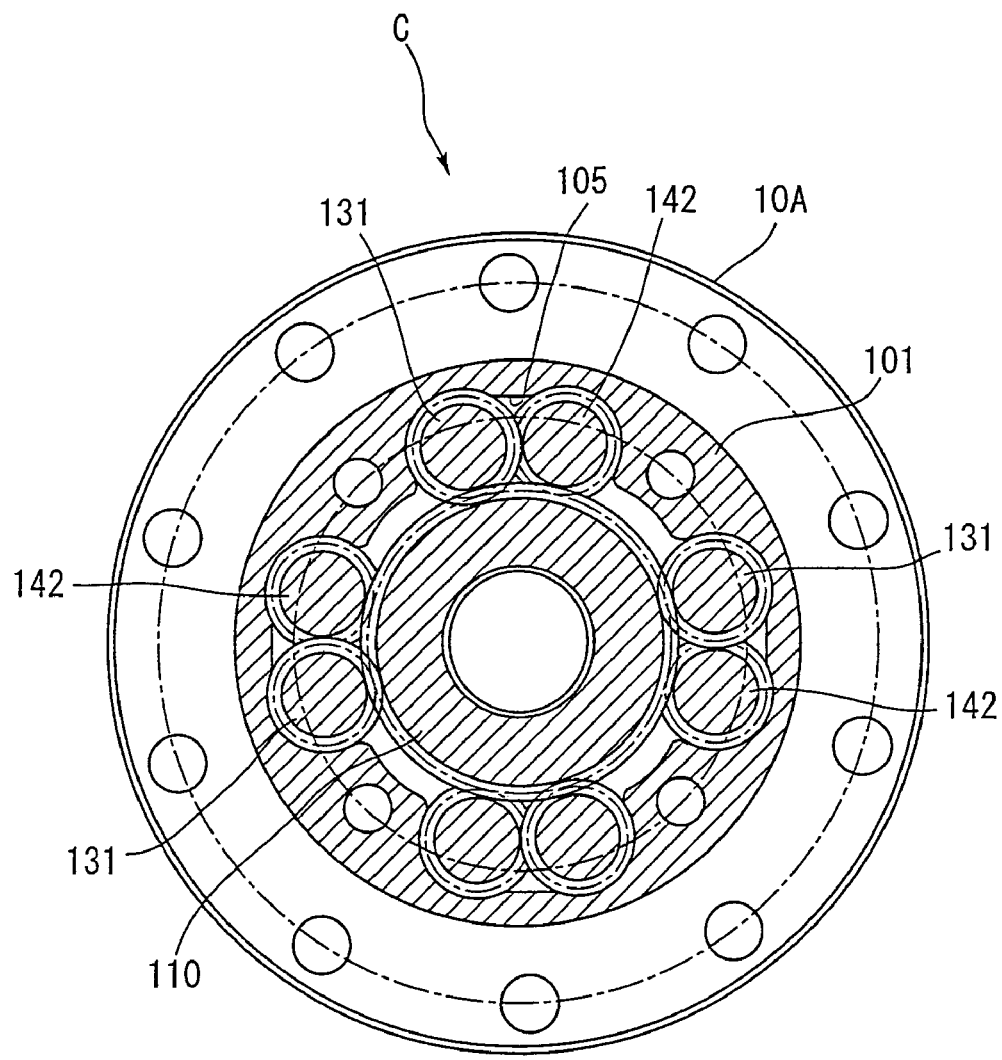
FIG. 10 is a sectional view taken on line X—X of FIG. 9.

FIGS. 9 through 12 show a third embodiment of the present invention. A differential gear apparatus C for vehicles of this embodiment includes, as shown in FIGS. 9 and 10, a housing 100 which is driven for rotation about the axis L. The housing 100 is comprised of a main body part 100A and a lid part 100B. The main body part 100A includes a circular cylindrical part 101 with its axis aligned with the axis L, and a bottom part 102 formed on one end part (left end part in FIG. 9) of the circular cylindrical part 10. A through-hole 103 with its axis aligned with the axis L is formed in the central part of the bottom part 102. The lid part 100B is adapted to close the other end opening part of the circular cylindrical part 101 and fixedly pressed against the other end face of the circular cylindrical part 101 by tightening means such as a bolt T. A through-hole 104 with its axis aligned with the axis L is formed in the central part of the lid part 100B.

Within the housing 100, a pair of side gears (sun gear) 110, 120 are rotatably disposed in such a manner as to be arranged in a row on the axis L. The side gear 110 is provided with an external gear part 111 having a helical tooth formed on its inner side end part adjacent to the side gear 120 and a reduced-diameter part 112 having a diameter smaller than that of the dedendum circle of the external gear part 111 formed on its outer side end part. The side gear 120 is provided with an external gear part 121 having the same gear dimensions (including a case where the helical direction is opposite) as the external gear part 111 which external gear part 121 is formed on the inner side end part of the side gear 120 adjacent to the side gear 110 and a reduced-diameter part 122 having a diameter smaller than that of the dedendum circle of the external gear part 121 is formed on the outer side end part of the side gear 120. One end parts of output shafts (not shown) extending respectively through the through-holes 103, 104 are non-rotatably fitted respectively to the inner peripheral surfaces of the side gears 110, 120. In case the differential gear apparatus is used, for example, as a front differential gear, the other end parts of the output shafts are connected to the left and right front wheels, respectively.

At least one receiving recess 105 extending from an end face on the opening portion side of the circular cylindrical part 101 to the bottom part 102 is formed in the inner peripheral surface of main body part 100A. Four receiving recesses 105 are formed in this embodiment and those receiving recesses 105 are arranged equidistantly away from each other in the peripheral direction. A pair of pinion gears (planetary gears) 130, 140 are received in each receiving recess 105 such that the pair of pinion gears 130, 140 can rotate about their own axes and integrally rotate (revolve) together with the housing 100 about the axis L.

The first pinion gear 130 includes a long gear part 131 formed on its one end part (left end part in FIG. 9), a short gear part 132 formed on its other end part, and a neck part 133 having an outside diameter smaller than the diameter of any of the dedendum circles of the long gear part 131 and the short gear part 132 and formed on the central part of the first pinion gear 130. The second pinion gear 140 includes a long gear part (not shown) formed on its one end part (right end part in FIG. 9), a short gear part 142 formed on its other end part, and a neck part (not shown) having an outside diameter smaller than the diameter of any of the dedendum circles of the long gear part 141 and the short gear part 142 and formed on the central part of the second pinion gear 140. The long gear part 131 of the first pinion gear 110 is meshed at its inner side end part with the external gear part 111 of the first side gear 110 and at its outer side end part with the short gear part 142 of the second pinion gear 140. The long gear part of the second pinion gear 140 is meshed at its inner side end part with the second side gear 120 and at its outer side end part with the short gear part 132 of the first pinion gear 130. Owing to this arrangement, when the housing 100 is rotated, its rotation is transmitted to the pair of side gears 110, 120 through the pair of pinion gears 130, 140. When the pair of pinion gears 130, 140 are not rotated, the pair of side gears 110, 120 are integrally rotated together with the housing 100 and the pinion gears 130, 140, but when the pair of pinion gears 130, 140 are rotated in opposite directions to each other, the pair of side gears 110, 120 are differentially rotated.

Figure 11:
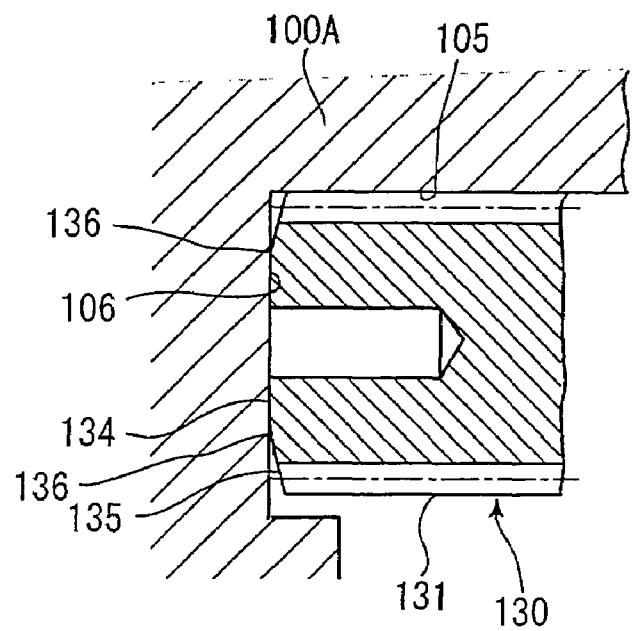
FIG. 11 is an enlarged view of an encircled part indicated by Y of FIG. 9.
Figure 12:
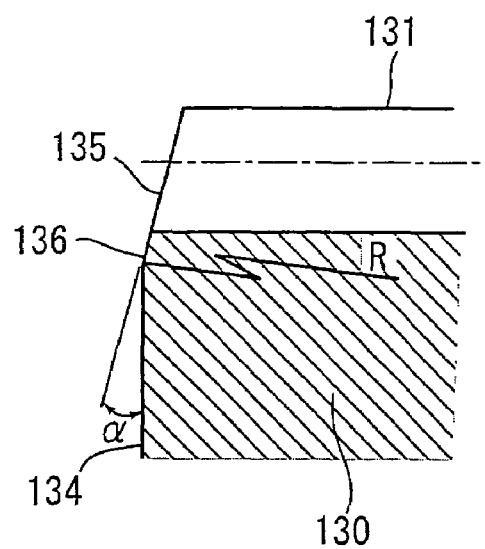
FIG. 12 is an enlarged sectional view showing an essential part of a planetary gear used in the above embodiment.

As shown in FIGS. 11 and 12, chamfering 135 intersecting with the outer peripheral surface is formed at a left end face of the pinion gear 130 opposing a left end face (abutment surface) 106 of the receiving recess 105. This chamfering 135 is formed as a tapered surface having a small angle α (about 10 to 15 degrees) formed between the left end face 134 and itself. The width in the radial direction of the pinion 130 is set to be equal to or larger than the tooth height of the long gear part 131. In other words, the diameter on the reduced-diameter side of the chamfering 135 (diameter at the intersection part with the left end face 134 of the chambering 135) is set to be equal to or slightly smaller than the diameter of the dedendum circle of the long gear part 131. A convexly curved surface part 136 is formed at the intersection part between the chamfering 135 and the left end face 134. This convexly curved surface 136 is formed on an arcuate surface having a large radius of curvature. The convexly curved surface part 136 may be formed of any other convexly curved surface than an arcuate surface. The opposite end parts of the convexly curved surface part 136 are smoothly contacted with the left end face 134 and the chamfering 135, respectively. The same chamfering and convexly curved surface part (none of them is shown) as the chamfering 135 and the convexly curved surface part 136 formed on the left end face 134 of the pinion gear 130 are also formed on the right end face of the first pinion gear 130 and on the left and right end faces (not shown) of the second pinion gear 140. The right end face 137 of the first pinion gear 130 and the right end face of the second pinion gear 140 are abutted with the left end face (abutment surface) opposing the receiving recess 105 of the lid part 100B and the left end face of the second pinion gear 140 is abutted with the left end face 106 of the receiving recess 105.

In the differential gear apparatus C thus constructed, when the pinion gear 130 is rotated, the left end face 134 of the pinion gear 130 is surface contacted with the left end face 106 of the receiving recess 105, if its axis is in parallel with the axis L. Accordingly, the left end face of the pinion gear 130 is not worn early. However, the pinion 130 is sometimes slanted with respect to the axis L when it is subjected to reaction caused by its meshing with the side gear 110 and the pinion gear 140. In such a case, if there is no formation of the convexly curved surface part 136, a ridge line formed on the intersection part between the left end face 134 and the chamfering 135 is nearly point contacted with the end face 134. Thus, the intersection part between the left end face 134 and the chamfering 135 of the pinion gear 130 is worn early. On the other hand, if the convexly curved surface part 136 is formed on the intersection part between the end face 134 and the chamfering 135, the contact area between the above-mentioned intersection part and the left end face 105 can be increased when the pinion gear 130 is slanted. Thus, the intersection part between the left end face of the pinion gear 130 and the chamfering 135 can be prevented from getting worn early. This is likewise applicable to the intersection part between the right end face 137 and the chamfering of the pinion 130 and to the intersection parts between the left and right end faces and the chamferings of the pinion gear 140.

The arrangement in which the convexly curved surface part is formed on the intersection parts between the left and right end faces and the chamferings of the pinion gear (planetary gear) is likewise applicable to the above-mentioned differential gear apparatuses A, B and a differential gear apparatus D as later described.

Figure 13:
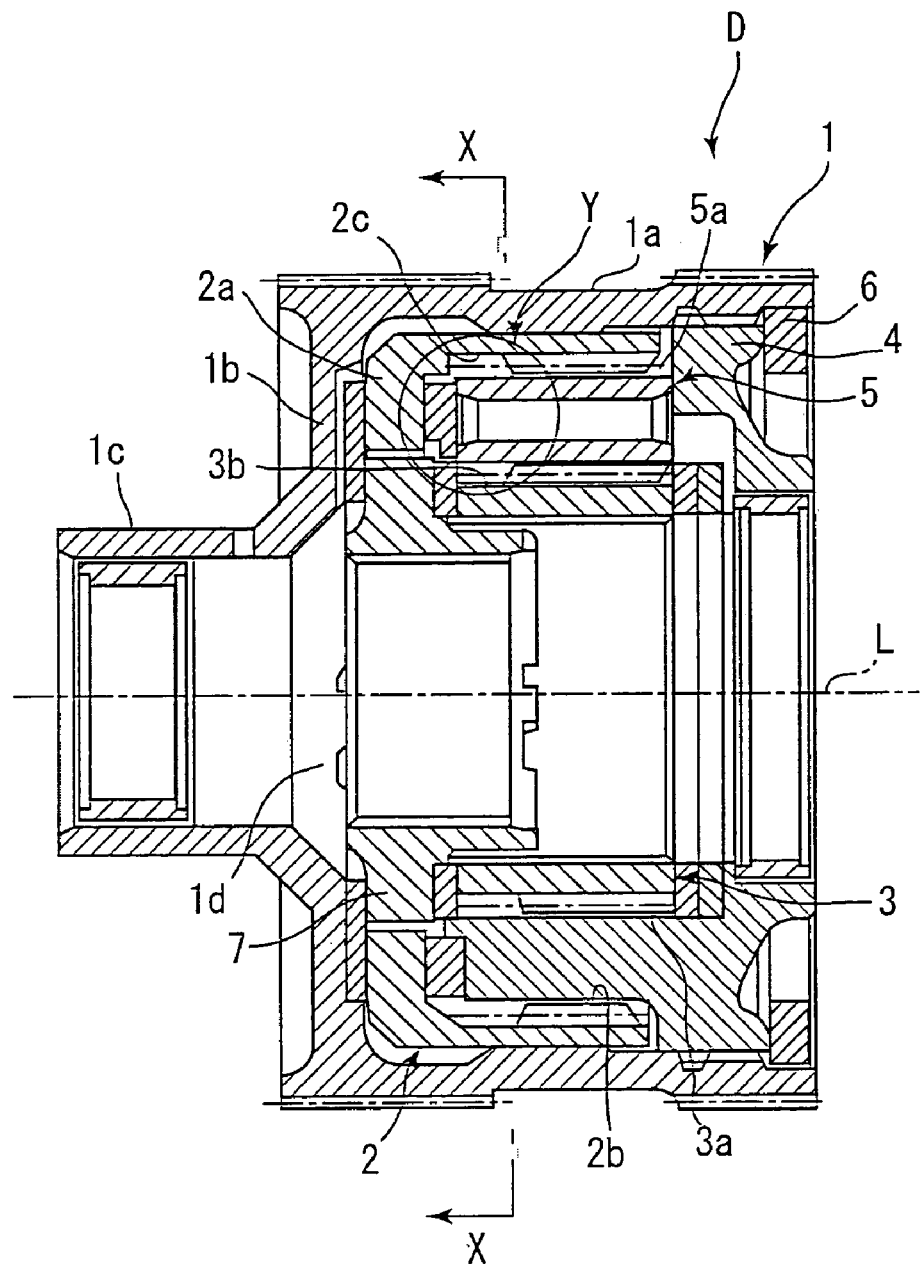
FIG. 13 is a sectional view taken on line X—X of FIG. 14, but showing a fourth embodiment of the present invention.
Figure 14:
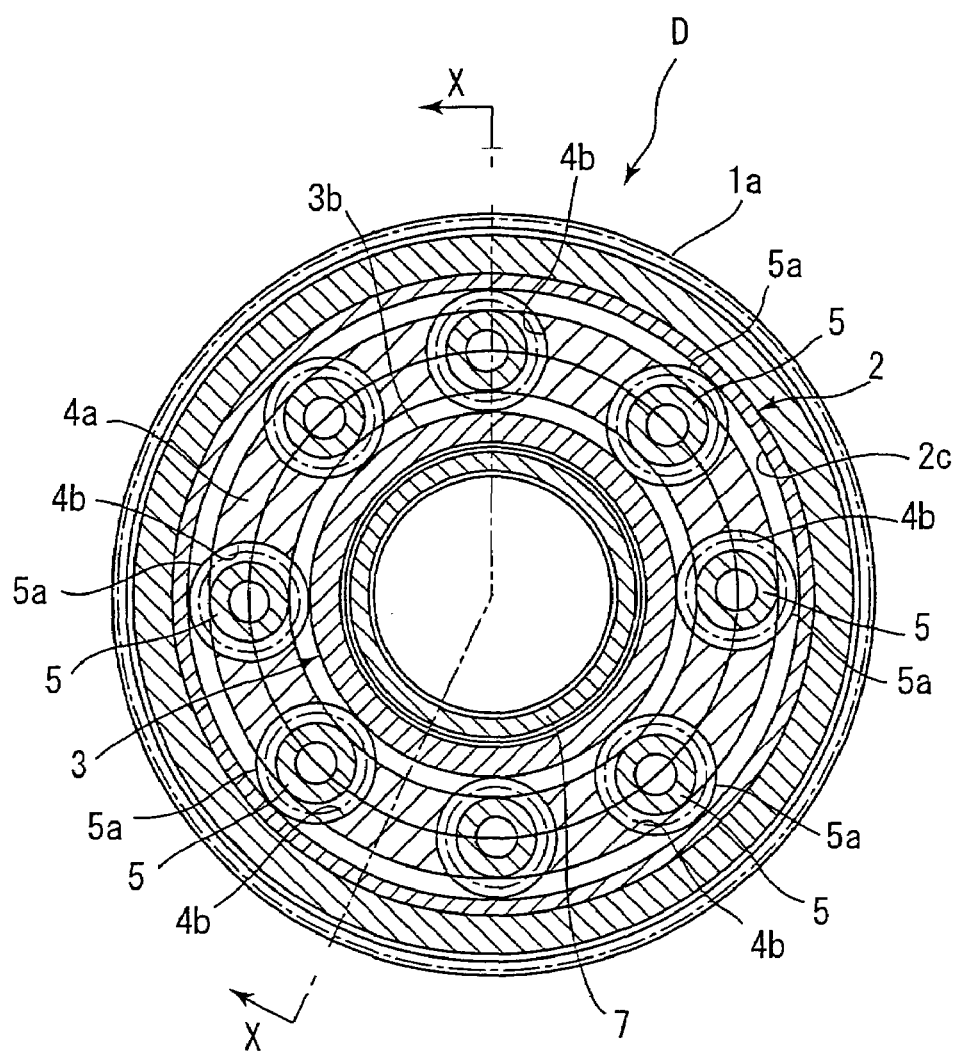
FIG. 14 is a sectional view taken on line X—X of FIG. 13.

FIGS. 13 through 15 show a fourth embodiment of the present invention. A differential gear apparatus D for vehicles in this embodiment is only partly different in construction from the above-mentioned differential gear apparatus A and all the remaining construction thereof is same as the differential gear apparatus A. Therefore, only the construction of the differential gear apparatus D different from that of the differential gear apparatus A will be described, and the same construction is denoted by same reference numeral and description thereof will be omitted.

As shown in FIGS. 13 and 15, in this differential gear apparatus D, an annular connection part 2a and an internal gear part 2b of the internal gear 2 are arranged away from each other in the direction of the axis L, and a circular first guide part 2c in section annularly extending about the axis L is formed on the inner peripheral surface of the internal gear 2 located between the annular connection part 2a and the internal gear part 2b. The inside diameter of this first guide part 2c is generally equal to a value obtained by adding the outside diameter of the planetary gear 5 to the diameter of the circumference (circumference on which the respective receiving holes 4b are arranged) on which the respective planetary gears 5 are arranged. Owing to this arrangement, when the planetary gears 5 are revolved, the outer peripheral surface of each planetary gear 5 can be abutted (can be slide contacted) with the first guide part 2c.

A circular second guide part 3b in section annularly extending about the axis L is formed on the outer peripheral surface of the sun gear 3 opposing the first guide part 2c. The inside diameter of this second guide part 3b is generally equal to a value obtained by subtracting the outside diameter of each planetary gear 5 from the diameter of a circumference on which the respective planetary gears 5 are arranged. Owing to this arrangement, when the planetary gears 5 are revolved, the outer peripheral surface of each planetary gear 5 can be abutted (can be slide contacted) with the second guide part 3b.

In the differential gear apparatus D thus constructed, since the outer peripheral surface of each planetary gear 5 is slide contacted with the first guide part 2c and the second guide part 3b when the planetary gear 5 is revolved, the planetary gear 5 can be prevented from slanting in the radial direction of the internal gear 2 and the sun gear 3. Thus, partially wear, which would otherwise occur due to rotation of the planetary gear 5 in its slanted state, can be prevented from occurring. Moreover, since the planetary gear 5 can be prevented from slanting and the planetary gear 5 is guided by the first and second guide parts 2c, 3b in the peripheral direction when the planetary gear 5 is revolved, the generation of noises can be reduced during the differential operation, and the torque bias ratio can be stabilized.

FIG. 16 shows a fifth embodiment of the present invention. In this embodiment, a circular cylindrical guide member 8 is disposed between the sun gear 3 and the output member 7 with its axis aligned with the axis L. A third guide part 8a is formed on the outer peripheral surface of this guide member 8. This third guide part 8a corresponds to the second guide part 3b of the sun gear 3 in the above-mentioned differential gear apparatus D and has the same outside diameter as the second guide part 3b. All the remaining construction is same as the differential gear apparatus D. Thus, the same operation and effect as in the differential gear apparatus D can also be obtained in this embodiment.

Figure 17:
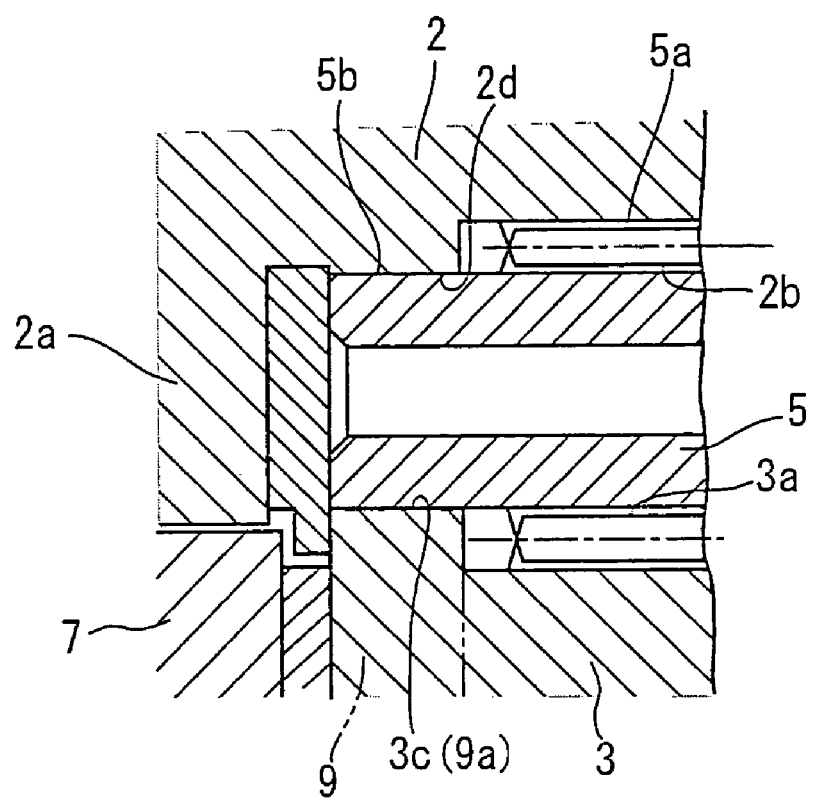
FIG. 17 is a sectional view like FIG. 15, but showing a sixth embodiment of the present invention.

FIG. 17 shows a sixth embodiment of the present invention. In this embodiment, a left end part of the planetary gear 5 projects leftward from the internal gear part 2b of the internal gear 2 and the external gear part 3a of the sun gear 3, and such projected left end part serves as a guide shaft part 5b. This guide shaft part 5b has a circular outer peripheral surface in section and formed with its axis aligned with the axis of the planetary gear 5. The guide shaft part 5b may be formed on the right end part of the planetary gear 5. Although the outside diameter of the guide shaft part 5b is set to be generally equal to the diameter of the dedendum circle of the gear part 5a, it may be set optionally. For example, it may be equal to the outside diameter of the gear part 5a or smaller or larger than that. On the other hand, a circular outer side guide part 2d in section annularly extending about its axis (axis L) is formed on the inner peripheral surface of the internal gear 2 opposing the guide shaft part 5b, and a circular inner side guide part 3c in section annularly extending about its axis (axis L) is formed on the outer peripheral surface of the sun gear 3 opposing the guide shaft part 3. The inside diameter of the outer side guide part 2d and the outside diameter of the inner side guide part 3c are set such that when the planetary gear 5 is revolved about the axis L, the outer peripheral surface of the guide shaft part 5b is abutted (slide contacted) with the inner peripheral surface of the outer side guide part 2d and the outer peripheral surface of the inner side guide part 3c. All the remaining construction is same as the differential gear apparatus D. Thus, the same effect as in the differential gear apparatus D can also be obtained in this embodiment.

In the embodiment shown in FIG. 17, although the inner side guide part 3c is integrally formed on the sun gear 3, it is also accepted that a portion, as indicated by a phantom line in the Figure, having the inner side guide part 3c is separately formed from the sun gear 3 and serves as a guide member 9, and an inner side guide part 9a corresponding to the inner side guide part 3c is formed on the outer peripheral surface of the guide member 9.

The arrangement in which the first and second guide parts 2c, 3b are formed on the inner peripheral surface of the internal gear 2 and the outer peripheral surface of the sun gear 3 respectively, the first and third guide parts 2c, 8a are formed on the inner peripheral surface of the internal gear 2 and the outer peripheral surface of the guide member 8 respectively, and the guide shaft part 5b is formed on the planetary gear 5, and the outer side guide part 2d and the inner side guide part 3c (9a) are formed on the inner peripheral surface of the internal gear 2 and the outer peripheral surface of the sun gear 3 (or the outer peripheral surface of the guide member 9), can likewise be applied to the above-mentioned differential gear apparatuses A, B.

INDUSTRIAL APPLICABILITY

A differential gear apparatus for vehicles according to this invention can be utilized as a center differential gear and a front differential gear for automobiles or as a center differential gear for four-wheel drive vehicles.

What is claimed is:

1. A differential gear apparatus for vehicles comprising an internal gear, a sun gear disposed at the inner side of said internal gear with an axis thereof aligned with that of said internal gear, a carrier including a circular cylindrical supporting part inserted between said internal gear and said sun gear with an axis thereof aligned with the axes of said internal gear and said sun gear, said supporting part being formed with a receiving hole whose axially outer and inner sides are open, and a planetary gear rotatably received in said receiving hole of said carrier and meshed with said internal gear at said open part on the outer side of said receiving hole and meshed with said sun gear at the open part on the inner side of said receiving hole, wherein one side part of an inner peripheral surface of said receiving hole in a peripheral direction of said supporting part is constituted of an arcuate face having a same radius of curvature as the radius of said planetary gear, the other side part is constituted of an arcuate face having a radius of curvature equal to or larger than the radius of said planetary gear, and when said planetary gear is contacted with said one side part or said other side part of the inner peripheral surface of said receiving hole, a gap is formed between said other side part of the inner peripheral surface of said receiving hole and the outer peripheral surface of said planetary gear.

2. A differential gear apparatus for vehicles according to claim 1, wherein said one side part and said other side part of said inner peripheral surface of said receiving hole are each constituted of an arcuate face having a same radius of curvature as the radius of said planetary gear.

3. A differential gear apparatus for vehicles according to claim 2, wherein centers of curvature of the respective arcuate faces constituting said one side part and said other side part of said inner peripheral surface of said receiving hole are arranged spaced away from each other in the peripheral direction of said supporting part.

4. A differential gear apparatus for vehicles comprising an internal gear, a sun gear disposed at the inner side of said internal gear with an axis thereof aligned with that of said internal gear, a carrier including a circular cylindrical supporting part inserted between said internal gear and said sun gear with an axis thereof aligned with the axes of said internal gear and said sun gear, said supporting part being formed with a receiving hole whose axially outer and inner sides are open, and a planetary gear rotatably received in said receiving hole of said carrier and meshed with said internal gear at said open part on the outer side of said receiving hole and meshed with said sun gear at the open part on the inner side of said receiving hole, wherein a part of said planetary gear meshed with said internal gear and said sun gear is formed in a complete gear tooth part and an end part of said planetary gear axially projecting from said internal gear and said sun gear is formed in an incomplete gear tooth part, and the width of a tooth crest of said incomplete gear tooth part in the peripheral direction of said planetary gear is set larger than the width of a tooth crest of said complete gear tooth part.

5. A differential gear apparatus for vehicles according to claim 4, wherein a part of said receiving hole receiving therein an end part of said planetary gear where said incomplete gear tooth part is formed is a circular hole, in section, continuously formed over the entire periphery.

6. A differential gear apparatus for vehicles comprising a housing, a sun gear rotatably disposed in said housing and having a helical tooth, and a planetary gear disposed in said housing in such a manner as to be able to rotate about its own axis and meshed with said sun gear, said housing being provided with an abutment surface which is formed on an inner surface thereof and which is adapted to allow an end face of said planetary gear to abut therewith, said planetary gear being provided with a tapered face-like chamfering which is formed on the outer periphery side of an end face of said planetary gear and whose width in the radial direction of said planetary gear is equal to or more than the height of tooth of said planetary gear, wherein an intersection part between an end face of said planetary gear and said chamfering is formed with a convexly curved surface part capable of smoothly contacting said end face of said planetary gear and said chamfering.

7. A differential gear apparatus for vehicles comprising an internal gear, a sun gear disposed at the inner side of said internal gear with an axis thereof aligned with that of said internal gear, a carrier including a circular cylindrical supporting part inserted between said internal gear and said sun gear with an axis thereof aligned with the axes of said internal gear and said sun gear, said supporting part being formed with a receiving hole whose axially outer and inner sides are open, and a planetary gear rotatably received in said receiving hole of said carrier and meshed with said internal gear at said open part on the outer side of said receiving hole and meshed with said sun gear at the open part on the inner side of said receiving hole, wherein said internal gear is provided at an inner peripheral surface thereof with a first guide part annularly extending about the axis of said internal gear and capable of abutting with an outer peripheral surface of said planetary gear, and said sun gear is provided at an outer peripheral surface thereof opposing said first guide part with a second guide part annularly extending about the axis of said sun gear and capable of abutting with an outer peripheral surface of said planetary gear.

8. A differential gear apparatus for vehicles comprising an internal gear, a sun gear disposed at the inner side of said internal gear with an axis thereof aligned with that of said internal gear, a carrier including a circular cylindrical supporting part inserted between said internal gear and said sun gear with an axis thereof aligned with the axes of said internal gear and said sun gear, said supporting part being formed with a receiving hole whose axially outer and inner sides are open, and a planetary gear rotatably received in said receiving hole of said carrier and meshed with said internal gear at said open part on the outer side of said receiving hole and meshed with said sun gear at the open part on the inner side of said receiving hole, wherein said internal gear is provided at an inner peripheral surface thereof with a first guide part annularly extending about the axis of said internal gear and capable of abutting with an outer peripheral surface of said planetary gear, a guide member is disposed at an inner side of said internal gear, said guide member is provided at an outer peripheral surface thereof opposing said first guide part with a third guide part annularly extending about the axis of said internal gear and capable of abutting with an outer peripheral surface of said planetary gear.

9. A differential gear apparatus for vehicles comprising an internal gear, a sun gear disposed at the inner side of said internal gear with an axis thereof aligned with that of said internal gear, a carrier including a circular cylindrical supporting part inserted between said internal gear and said sun gear with an axis thereof aligned with the axes of said internal gear and said sun gear, said supporting part being formed with a receiving hole whose axially outer and inner sides are open, and a planetary gear rotatably received in said receiving hole of said carrier and meshed with said internal gear at said open part on the outer side of said receiving hole and meshed with said sun gear at the open part on the inner side of said receiving hole, wherein said planetary gear is provided at an outer peripheral surface thereof with a guide shaft part capable of turnably abutting with an inner peripheral surface of said internal gear and an outer peripheral surface of said sun gear.

10. A differential gear apparatus for vehicles comprising an internal gear, a sun gear disposed at the inner side of said internal gear with an axis thereof aligned with that of said internal gear, a carrier including a circular cylindrical supporting part inserted between said internal gear and said sun gear with an axis thereof aligned with the axes of said internal gear and said sun gear, said supporting part being formed with a receiving hole whose axially outer and inner sides are open, and a planetary gear rotatably received in said receiving hole of said carrier and meshed with said internal gear at said open part on the outer side of said receiving hole and meshed with said sun gear at the open part on the inner side of said receiving hole, wherein said internal gear is provided at an inner side thereof with a guide member having a circular guide part in section with an axis thereof aligned with the axis of said internal gear, and said planetary gear is provided at an outer peripheral surface thereof with an annular guide part capable of turnably abutting with an inner peripheral surface of said internal gear and an outer peripheral surface of said guide part.

* * * * *